United States Patent
Piszczek et al.

(10) Patent No.: US 9,477,279 B1
(45) Date of Patent: Oct. 25, 2016

(54) DATA STORAGE SYSTEM WITH ACTIVE POWER MANAGEMENT AND METHOD FOR MONITORING AND DYNAMICAL CONTROL OF POWER SHARING BETWEEN DEVICES IN DATA STORAGE SYSTEM

(71) Applicant: DATADIRECT NETWORKS, INC., Chatsworth, CA (US)

(72) Inventors: Michael J. Piszczek, Laurel, MD (US); Jason M Cope, Highland, MD (US); Pavan Kumar Uppu, Woodbine, MD (US)

(73) Assignee: DataDirect Networks, Inc., Chatsworth, CA (US)

( * ) Notice: Subject to any disclaimer, the term of this patent is extended or adjusted under 35 U.S.C. 154(b) by 169 days.

(21) Appl. No.: 14/293,047

(22) Filed: Jun. 2, 2014

(51) Int. Cl.
*G06F 11/30* (2006.01)
*G06F 1/00* (2006.01)
*G06F 1/32* (2006.01)
*G06F 1/26* (2006.01)

(52) U.S. Cl.
CPC ............ *G06F 1/26* (2013.01); *G06F 11/3062* (2013.01)

(58) Field of Classification Search
CPC ....................................................... G06F 1/30
USPC ....................................................... 713/340
See application file for complete search history.

(56) References Cited

U.S. PATENT DOCUMENTS

| | | | | |
|---|---|---|---|---|
| 7,562,234 | B2 * | 7/2009 | Conroy et al. | 713/300 |
| 7,904,287 | B2 * | 3/2011 | Lefurgy et al. | 703/21 |
| 8,046,600 | B2 * | 10/2011 | Holle et al. | 713/300 |
| 8,751,836 | B1 | 6/2014 | Piszczek et al. | |
| 8,769,316 | B2 * | 7/2014 | Ananthakrishnan et al. | 713/300 |
| 2005/0210304 | A1 * | 9/2005 | Hartung et al. | 713/320 |
| 2014/0067139 | A1 * | 3/2014 | Berke et al. | 700/291 |

* cited by examiner

*Primary Examiner* — Suresh Suryawanshi
(74) *Attorney, Agent, or Firm* — Rosenberg, Klein & Lee (57) ABSTRACT

A data storage system is implemented with an active power monitoring and control performed by a control node elected among a number of nodes. A real-time power monitoring information is supplied to the control node from, a power monitoring logic residing at each device in the system. The devices in the data storage system are pre-allocated with respective individual power budgets which are below the maximum power usage thereof. The power budgets of all the equipment cumulatively constitute a power budget assigned to the group of equipment. The control node controls dynamically and in real time power sharing between the plurality devices so that the devices with required power usage below the pre-allocated power budget can share their extra power credits with devices which are in need for extra power for performing its operation. The control node provides sharing of the power among the equipment in the data storage system with a goal of avoiding exceeding of the cumulative power budget assigned for the entire system or the cluster of the equipment.

31 Claims, 7 Drawing Sheets

DATA STORAGE SYSTEM WITH ACTIVE POWER MANAGEMENT AND METHOD FOR MONITORING AND DYNAMICAL CONTROL OF POWER SHARING BETWEEN DEVICES IN DATA STORAGE SYSTEM

FIELD OF THE INVENTION

The present invention is directed to a data storage system capable of active power management and power consumption monitoring, and provided with a control mechanism to efficiently address power budget management requirements.

In overall concept, the present invention is directed to a data storage system with active power management logic, operating based on an algorithm which ties together individual components of the data storage system so that their power usage is precisely coordinated in real time and in dynamical fashion to prevent exceeding a power budget assigned to the data storage system.

More in particular, the present invention is directed to a data storage system implemented with a plurality of devices (including data storage nodes, compute notes, servers, switches, routers, storage controllers, etc.), each equipped with power usage monitoring logic, and which are operatively interconnected for controlled power sharing therebetween in a highly efficient fashion.

The present invention is also directed to a data storage system composed of a plurality of heterogeneous devices, among which one (or more) centralized control node(s) is (are) elected which is (are) dedicated for dynamically controlling power sharing across a cluster (group) of devices, or the entire data storage system, based on real-time readings of power monitoring logic residing at each device. An individual pre-allocated power budget is controlled for each device in the cluster of devices in question, and a cumulative pre-allocated power budget is controlled for the cluster of devices. If a real-time required power usage of a device is below its pre-allocated individual power budget, this device can give away extra power credits to the elected control device(s), which in its (their) turn can share the extra power credits with a device which needs power exceeding the pre-allocated power budget for the operation, thus effectively changing the individual power budgets of each device, retaining however the overall cumulative power usage for the cluster of devices below (or at the level of) the pre-assigned power budget. The entire process is performed in highly dynamical and real time manner based on real time readings of the power usage acquired by the power monitoring logic residing at each device of interest.

The present invention is further directed to a data storage system built with clusters of devices, each provided with the monitoring logic in communication with a control device and capable of requesting extra power or giving away unused extra power for adjusting its power usage based on its needs and availability of additional power credits it can receive from other devices which operate below their pre-allocated individual power budget.

The present invention is also directed to a data storage system with active power management where the devices may be clustered into groups, and where a control device is elected among the devices for controlling the power sharing either between the devices in a single group, or in several groups, or through the entire data storage system, and further where the control device may be elected as a part of any of the device's group, or be extraneous thereto.

Further, the present invention is directed to a data storage system pre-allocated with a power budget, where the activities and, subsequently, the power usage, of each piece of equipment are controllably coordinated in a dynamical real time fashion depending on the activity of each particular piece of equipment, i.e., the nodes (devices) which have a lower power usage can share unused power credits with nodes (devices) which require a higher power usage. The power sharing through a cluster of homogeneous equipment or heterogeneous devices, as well as through the entire data storage system, is performed with the goal to prevent exceeding the power consumption above the cumulative power budget pre-assigned for the cluster of devices, or the entire data storage system.

BACKGROUND OF THE INVENTION

Power management is a challenging problem for complex data storage systems using dynamic massive arrays of drives, client/compute nodes, server storage systems, cloud computing, drive enclosures housing drive arrays, switches, etc., as well as data transaction processing.

Data storage arrays, that use some form of RAID, provide the necessary capacity, bandwidth, and full-resilience that is expected of servers in the environment of generating large volumes of data and storing data reliably, cost-effectively, and which must also be accessed efficiently. The data stored in the data storage systems are retained for extended periods of time, thereby leading to significant investment in storage.

Advancements in the field of complex data storage systems has brought the problem of high power consumption to the forefront. Data centers consume megawatts of power which consequently leads to excessive electricity bills. Another problem of such high power consumption is heat generated during the operation of complex data storage systems which leads to increased drive failure rates. In order to prevent severe crashes due to excessive heating, a sufficient cooling regimen has to be provided within the data storage system which may result in excessive operation costs.

By limiting the power consumption of storage devices for I/O (Input/Output) activity, the operational cost of the system may be significantly reduced, the life span of the data storage devices may be extended, and eco-friendly high performance computations may be attained in addition to reduction in the operational costs.

Usually, in order to constrain the power use in a computational facility, a system administrator would assign a maximum power budget to each piece of equipment. If every piece of equipment operates below the power budget, then the entire facility will operate below the power budget. However, this is not an efficient arrangement for complex data storage systems because some equipment (or nodes) may need more power than others at a given time due to their I/O load, and no data storage system is available where nodes that are not using all of their power could share the unused power with nodes that require more power for their operations.

A previous data storage system has been developed by the current Applicants having an efficient power management mechanism for a data storage system implemented in a drive enclosure through real-time monitoring and control of power consumption of the storage devices exclusively within the drive enclosure.

This previous system assumes the control of the power budget in the drive enclosure in a localized manner by housing a power control system within the drive enclosure that is configured to supervise, in real time, the loading power levels of the drives by directly monitoring the power usage of each drive, the input and output levels of the power supplies, and the temperature of the various enclosure components. Based on the acquired information, the system dynamically adjusts the power modes of drives.

However, being focused on controlling the power budget in a separate drive enclosure, this previous data storage system is not intended for, and therefore is not provided with the ability of active power monitoring and control of a cluster of equipment and maintaining a cumulative power budget across a number of heterogeneous devices in the data storage system through dynamical sharing of the power among the devices in the most efficient manner, and at the same time preventing exceeding of the power budget predetermined for the cluster of equipment, or even the entire data storage system.

SUMMARY OF THE INVENTION

It is an object of the present invention to tie multiple pieces of heterogeneous equipment in a data storage system together to monitor and control power usage in the entire system in the most efficient manner.

It is another object of the present invention to provide a data storage system where individual components operate in a coordinated manner through controllable sharing of their individual power budgets each with the other, when needed, with a goal of maintaining and preventing the surpassing of the overall power budget available in a power credit pool (which is the cumulative of the maximum power that could be supplied by the power sources in the system). Additionally, each node (device) in the system can adjust (under the control of control nodes) its own power usage based on its needs and any additional power credits it may obtain from other nodes operating with a reduced power usage.

It is a further object of the present invention to provide a data storage system with efficient active power management at a site where any node in need of extra power can send a request to a control node asking for additional power credits, and return the power credits which are unused in the operation.

It is still an object of the present invention to provide an efficient power management mechanism for a data storage system through an active real-time power monitoring and control of power usage in a cluster of equipment. The power management mechanism maintains a power budget across heterogeneous devices in the data storage system through the controllable changing of a power budget of each individual device in a cluster by dynamic sharing of the power among the devices in an efficient manner.

It is another project of the present invention to provide a data storage system where a plurality of client/compute nodes access the target storage devices for data storage and retrieval. Nodes that are not using their entire power budget, give away extra power as credits which other nodes may use to increase their power usage (power budget). In this arrangement, the nodes requiring additional power can solicit extra power credits from other nodes, and can attach a priority to the request depending on the urgency of the request.

It is an additional object of the present invention to provide a data storage system with an active power management, where each device is provided with its own power monitoring logic, and where one or more centralized control nodes are dedicated for controlling the power across the cluster of equipment or the entire data storage system. Each monitored device reports, in real-time, their power conditions to the centralized control node(s) and which is given dynamically in real time which results in a new power budget (reduced or increased) for performing an operation.

It is another object of the present invention to provide an efficient power management mechanism for a data storage system which is flexible enough to permit one or several centralized control nodes be dedicated for the control of power in a single rack of equipment, and/or on aisle of racks of equipment, or a section of a laboratory, or a separate room of the computational facility housing the data storage system. The control node can either reside in each rack of devices (nodes), or can control the power sharing across an aisle of racks, or through the entire data storage system, etc.

The present invention is further envisioned as a part of a data storage system with an object of permitting power sharing even in a situation where communication is lost between the racks of equipment. In this situation, central control nodes elected in the system for performing the controlled power sharing, would no longer be able to share power between them but could still manage the equipment in a rack to which they belong. If all communication is lost with the control nodes, then the equipment would automatically return to the pre-allocated individual power budgets to provide an uninterrupted operation of the data storage system.

In one aspect, the present system envisions a data storage system with an active power management which includes:

a group of devices, each device having a respective individual pre-allocated power budget thereto. The cumulative of the individual power budgets constitutes a power budget for the group of devices in question. The individual power budgets are assessed to be below the maximum power usage of each device, respectively, and the overall power budget is pre-assigned to be below the maximum power usage of the group of devices in question. Each device has a power monitoring sub-system which is configured for real-time monitoring of its required power usage.

A control device may be elected among the group of devices. The control device is equipped with a control processor in operative communication with the power monitoring sub-systems on other devices to receive, substantially in real-time, data corresponding to the required power usage of each device. The control processor is configured to process the data and to dynamically re-distribute and in-real time the power among the devices in the group in question in accordance with the required power usage and the respective individual pre-allocated power budget to the device to avoid surpassing of the overall power budget pre-assigned to the group of devices in question.

In the subject power sharing scheme, if at least a first device in the group in question has the required power usage below the individual pre-allocated power budget, this first device is controlled by the control processor to share extra power credits thereof with at least a second device in the group in question having the required power usage exceeding the respective individual pre-allocated power budget.

The group of devices may include either of data storage nodes, compute nodes, cloud computing equipment, file servers, switches, storage controllers, routers, data migration sub-systems, drive enclosures populated with data storage nodes, and combinations thereat constituting a group of heterogeneous equipment, as well as homogenous equipment.

The control processor can be configured to control power sharing among devices in a single group, or in several groups.

The devices in the subject data storage systems are configured for election of at least one control device having the control processor residing thereat, and for election of another control device from the group of devices, if the at least one control device becomes inoperative.

Furthermore, the devices are configured to elect at least a first control device and at least a second control device, each configured for controlling power sharing among devices in a respective ones of several groups of devices if communication between the groups of devices fails.

The present data storage system is configured with a power credit pool coupled to the group of devices in question and to the control processor residing at the control device. The control processor is also configured to receive and collect (at the power credit pool) extra power credits corresponding to the extra power available from devices operating below the pre-assigned power budget, and to transfer the extra power credits from the power credit pool to devices in need, or return the extra power credits to the devices when required.

The device needing extra power generates a power request signal soliciting extra power credits, and communicates the power request signal to the control processor. The power request signal may be generated with a priority attached thereto depending on the urgency of the power request.

The device operating below the power budget is configured to generate an available extra power signal, and communicate the available extra power signal to the control processor.

The device which gives up extra power credits is configured to specify a time interval and rate at which the extra power credit is reduced to a substantially zero level. Upon receipt of the reduced extra power credit, the receiving device can reduce its required power usage, or request extra power.

Each device is configured to automatically return to the respective individual pre-allocated power budget thereto when communication between the devices in the group fails. Additionally, each device is configured to operate at the respective individual pre-allocated power budget if each device requests extra power for an operation.

In addition to monitoring the power usage, the power monitoring logic in the subject data storage system is configured to monitor real-time ambient temperature. The control processor can compute a real-time heat map covering the group of devices in question based on real-time ambient temperature readings from the power monitoring logic of each device. The control processor is also configured to control the extra power sharing among the devices in the group in a manner preventing abnormalities in the heat map.

The control processor is configured to transfer extra power from a device generating excessive temperatures or to a device experiencing loss of outside power, and to generate high priority messages to a device requesting the giving up of extra power credits with high priority.

The subject data storage system uses at least one (or several) central power sources supplying a predetermined power level to the group of devices in question. The central power sources in the system constitute the power credit pool. The control processor of the control node controls the power sharing between the group of devices to avoid exceeding the predetermined power level generated by the central power source(s).

The central power source(s) is (are) configured with a power output unit for real-time managing and reporting, of the power output and maximum power output to the control processor.

The present invention further provides a method for active power management in a data storage system, through the steps of:

operatively interconnecting a plurality of devices into a respective at least one group of devices, and pre-allocating at least first and second devices of the plurality of devices with a first and a second individual power budget, respectively, where each of the first and second individual power budgets is selected to be below a maximum power usage of the corresponding one of the first and second devices. The at least first and second individual power budget cumulatively constitutes an assigned power budget for the plurality of devices in question.

The method further continues with configuring each of the at least first and second devices with a monitoring sub-system to monitor, in real-time, a required power usage of the at least first and second device, and electing at least one control device from the plurality of devices by configuring at least one control device with a control processor in communication with the monitoring sub-system of the at least first and second devices to receive therefrom data corresponding to the real-time required power usage of the at least first and second devices.

The current method further proceeds by configuring the control processor for dynamical and real-time re-distribution of a power among at least first and second devices in accordance with the real-time required power usages and the first and second individual power budgets of at least the first and second devices to prevent exceeding a predetermined power level of overall (cumulative) power consumption pre-assigned for the plurality of devices in question.

Upon actuating the control processor, the step of controlling the sharing of power between devices is performed, in accordance with which extra power credits of the first device operating below the pre-allocated individual first power budget are shared with the second device having the required power usage exceeding the pre-allocated individual second power budget. Thus, the control processor changes the pre-allocated individual power budgets of each device dynamically and in real time, in accordance with the needs and abilities of the devices in a manner avoiding exceeding the assigned overall power budget for the plurality of devices in question.

In order to receive the extra power credits, the device in need generates an extra power request and communicates the extra power request to the at least one elected control device. The extra power request may be generated with a high priority depending on the urgency of the extra power request.

The method is further detailed with the steps of:

specifying (at a device giving up the extra power credits) a time interval and a rate at which the shared extra power is automatically reduced to substantially zero over the specified time interval, and reducing the power usage at a receiving extra power device in accordance with the reduced power received. In addition, the device receiving the reduced power device may require extra power from the control device, or dynamically adjust the required power usage device to the pre-allocated individual power budget.

The subject method further comprises the steps of:

monitoring a real-time ambient temperature by the monitoring logic of each device, producing, by the control processor of the control device, a real-time heat map of the plurality of devices based on the monitored ambient temperature, and requesting via the control processor, an extra power credit of a respective device in a manner preventing abnormalities in the real-time heat map.

The subject method is designed with the ability to elect a plurality of control devices, and distributing a function of controlling the sharing of the extra power credits between the plurality of devices among the plurality of control devices.

It is considered beneficially for the subject method to elect control devices periodically to present for hire of the power managements in case one of the control devices becomes inoperative.

The subject method also contemplates to perform the steps of:

forming a power credit pool coupled to the plurality of devices and to at least one elected control device, forwarding the extra power credits from the at least first device to the control processor of the at least one elected control device, and collecting the extra power credits in the power credit pool if not needed immediately, and transferring via the control processor, the extra power credits from the power credit pool to the device in need upon receipt of the extra power request therefrom. The extra power credits can be returned to the device which previously gave them away when required by the dynamics of operation.

These and other objects and goals of the present invention will be more apparent in view of the specification when taken in conjunction with the patent drawings.

DETAILED DESCRIPTION OF THE PREFERRED EMBODIMENTS

Figure 1:
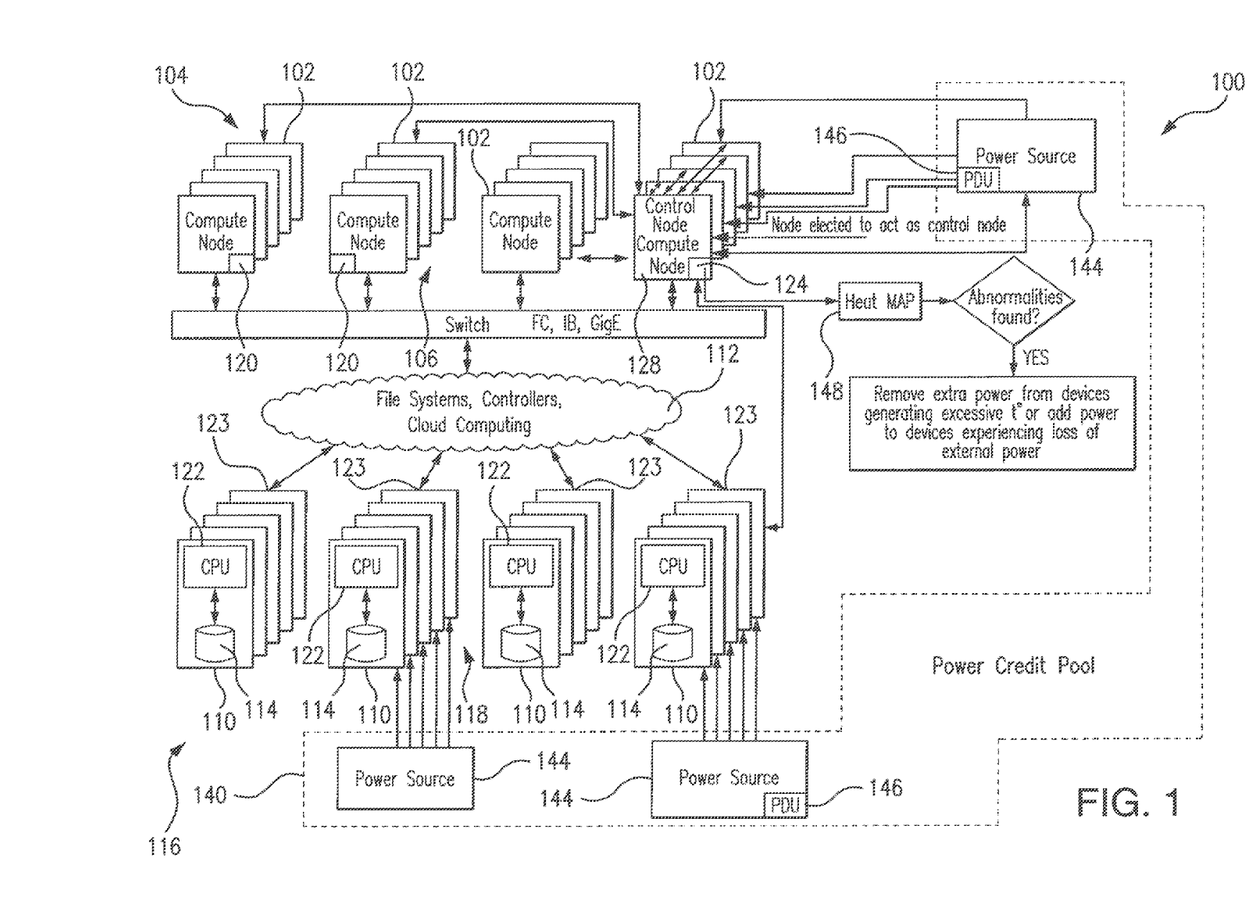
FIG. 1 is a block diagram of the data storage system of the present system showing the principles of the active power monitoring and control mechanism.
Figure 2:
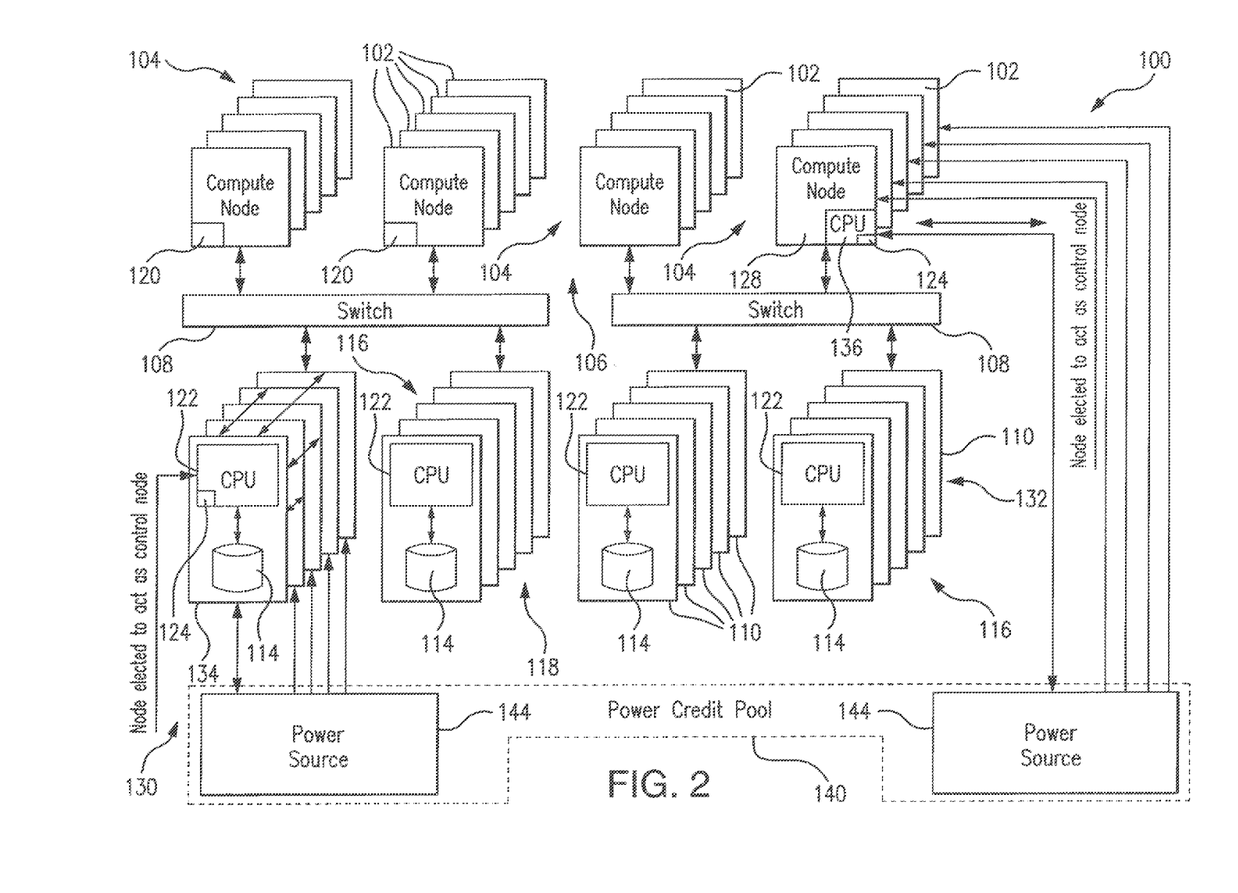
FIG. 2 is a block diagram of the data storage system of the present system where the system is split by connection failure and each of the device group elects its own control node for continuing power management.

Referring to FIGS. 1 and 2, system 100 of the present invention includes a number of compute nodes (or client nodes) 102. The computer nodes may be arranged in computing groups, or computer clusters, such as, for example, racks 104 or aisles 106 to perform complex computations of various types.

The operation of the compute node depends on the system application. They may function as servers, supercomputing clusters, etc., and have the capacity to "WRITE" by inputting data, as well as "READ" from an external memory or any other device. The subject system 100 is capable of handling any type of data transfer. In the present description, the above devices will also be intermittently referenced further as data generating entities, or computing architectures.

The compute nodes 102 are connected through a high speed network 108, which in turn is connected to target storage devices 110 through cloud computing 112, including computing hardware machines, such as servers, controllers, file systems, routers, etc.

In a complete cluster, the compute nodes are linked by a high speed network which permits the sharing of computers resources and memory. Data transfers, to or from the compute nodes 102, are performed through the high speed network 108 and is managed by additional computer devices, referred to herein as file servers.

File servers manage data migration from and to the compute nodes 102. The ratio of the compute nodes 102 to the servers may in some cases be in excess of 1000. The file servers satisfy requests of the compute nodes 102 in the same order as the requests are received at the file server.

During the input/output (I/O) cycle of the compute nodes operation, data may be transferred from the compute node's cache to the file servers which may place data in the file system for subsequent retrieval. The high speed network 108 functions as a high speed switch and can be based on any of the network transport protocols, such as, for example, Infinibind (IB), Fibre Channel (FC), and Gigabit Ethernet (GE).

Data retrieved from the compute nodes 102, and/or file servers (combinably referred to herein also as data generating entities), are intended to be stored on the target storage devices 110 which may be disc drives 114 (or alternatively in the form of flash memory) which may be arrayed, and may be grouped in racks 116 of data storage devices or aisles 118 of racks.

The storage device array may be arranged for example in the RAID (Redundant Array of Independent Drives) format which is a multi-dimensional array of data storage devices. For example, disc drives 114 may be distributed in READ/WRITE tier groups for storing data "D" and parity values "P" corresponding to the data stored in the array. Each tier group in the array constitutes a multiplicity of data storage channels.

Each compute node 102 has a software unit 120 which controls operation of the compute node for the intended purposes and locates I/O cycles during the execution of the compute node processes.

Storage controllers in the compute cloud 112 control operation of the data storage devices in the array which are accessed in an optimally sequential manner for data storage device exploitation (or in another efficient manner) providing the uncompromised I/O performance of the storage controller.

Preferably disc drives are provided with the capability of receiving data in the most efficient manner so that the system 100 may not require an excessive number of disc drives. Thus, the discs which do not participate in data transfer, may stay deactivated, as controlled by the storage controller for the period they are not accessed. This avoids excessive power consumption of the storage devices.

The capability of storing the data at the data storage devices in an orderly (or other efficient manner) in the system 100 may be provided by utilizing a data migration handling system (not shown) which can be operatively coupled between the compute nodes 102 and the storage devices (nodes) 110 to enable and improve duty cycle with a shorter I/O cycle of the compute nodes operation.

As shown in FIGS. 1 and 2, each data storage device (also intermittently referred to herein as data storage node) 110 includes one or more disc drives 114 (or alternatively a semiconductor flash data storage), and a node CPU (central processing unit) 122 bi-directionally communicating with the disc drives 114 and controlling the operation of the respective disc data storage node 110. Data (for example, an I/O request, READ request, or WRITE request) received from the client/compute nodes 102 at a port 123 of the data storage node 110, is transferred to the disc drive 114 by the CPU 122 in a preferred manner, for example, in an orderly manner or any other fashion supporting effective operation of the system 100.

In the present system, an active power monitoring and control algorithm 124 is implemented which underlines the operation of the active power management in a cluster of equipment by maintaining a power budget across the number of heterogeneous nodes and devices in the data storage system 100.

Specifically, each device in the system 100, i.e., compute nodes 102, data storage nodes 110, cloud computing equipment 112, file servers, file systems, controllers, storage controllers, etc., is pre-allocated with a respective individual power budget by a system administrator, which is selected below the maximum power usage of each piece of equipment. The individual power budgets cumulatively form an overall power budget assigned for a cluster of equipment.

Alternatively, the "individual" power budget also may be understood as being pre-allocated to a cluster (group) of devices (nodes). In this case, the cumulative power budget may be understood as assigned to a group of clusters.

Each compute node 102 and data storage node 110 in the system 100 monitors its own power usage and reports to one or more control nodes in the system. The system 100 has dedicated control nodes (i.e., one in each rack of nodes), or the equipment may elect one or more nodes within the system to act as control node. The active power monitoring and controlling algorithm 124 of the present invention is designed to tie multiple units of homogeneous, as well as heterogeneous, equipment in the data storage system 100 together to, in real-time, monitor and dynamically control power sharing between multiple units in the system to provide the operation of the data storage system under the assigned power budget. In this scheme, an efficient and proven saving operation of the system is attained while preventing any exceeding of the power budget.

Devices that operate below their pre-allocated individual budgets and are not using their entire pre-allocated power budget can "donate" the extra power, as credits to other devices which need extra power to increase their power usage for their operations.

Thus, the active power monitoring and control logic 124 provides a power budget of an individual device to be changed dynamically in real time during the system 100's operation. In this manner power can be shared and redistributed among the devices of the system in the most efficient manner provided by a power sharing logic routine 125 (shown in FIGS. 5 and 6) in accordance with real-time abilities and operational needs of the devices in the cluster (also referred to herein as groups), or throughout the entire data storage system. The active power monitoring and control logic 124 provides that the overall power budget of the equipment either in clusters or in groups, or in the entire system is not exceeded above the assigned budget.

Devices requiring additional power for their operation may solicit extra power credits from other devices. The devices that solicit for extra power credit may attach a priority to the request depending on the urgency of the request.

Figure 3:
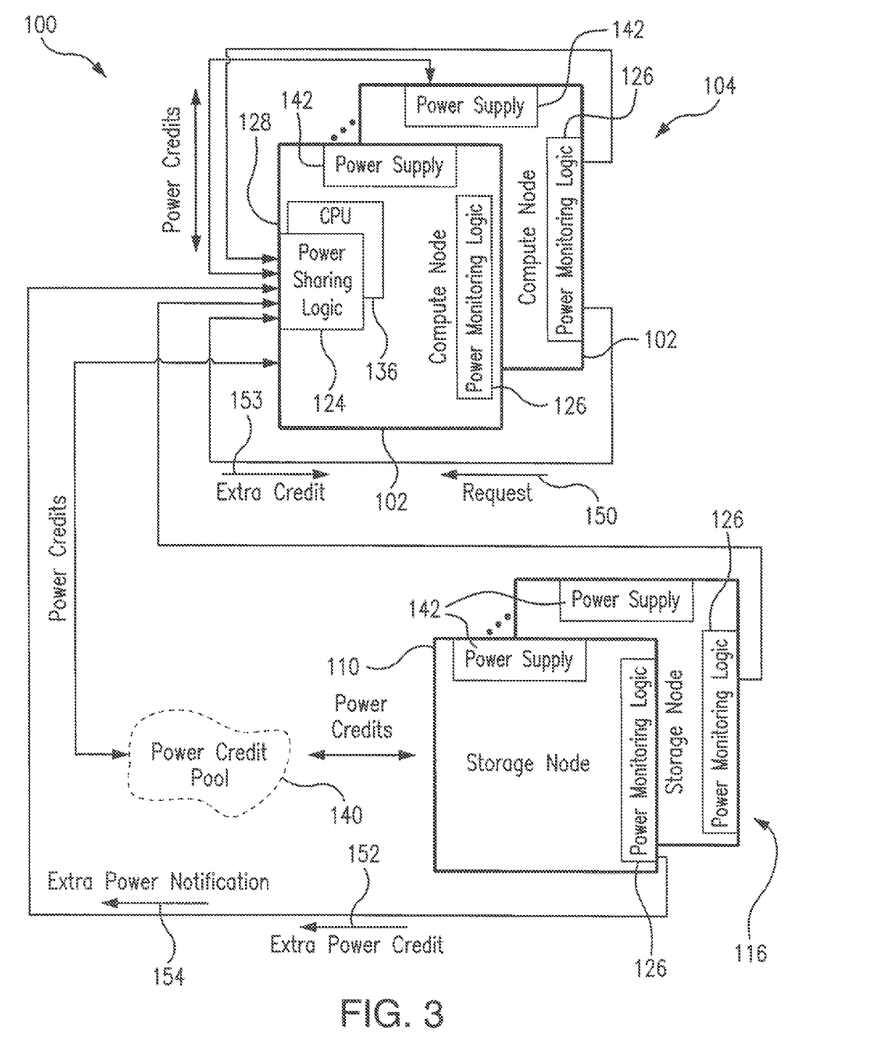
FIG. 3 is a block diagram of the data storage system of the present system showing in more detail the principles of the power sharing between heterogeneous devices in the present system.

To provide for the active power monitoring and control, the present system is implemented with a monitoring logic (also referred to herein as monitoring sub-system) 126. As shown in FIG. 3, the monitoring sub-system 126 preferably resides on each device. Alternatively, the monitoring logic may be implemented in somewhat centralized fashion for a cluster of equipment, but has the ability of monitoring power requirements of each individual device.

Figure 4:
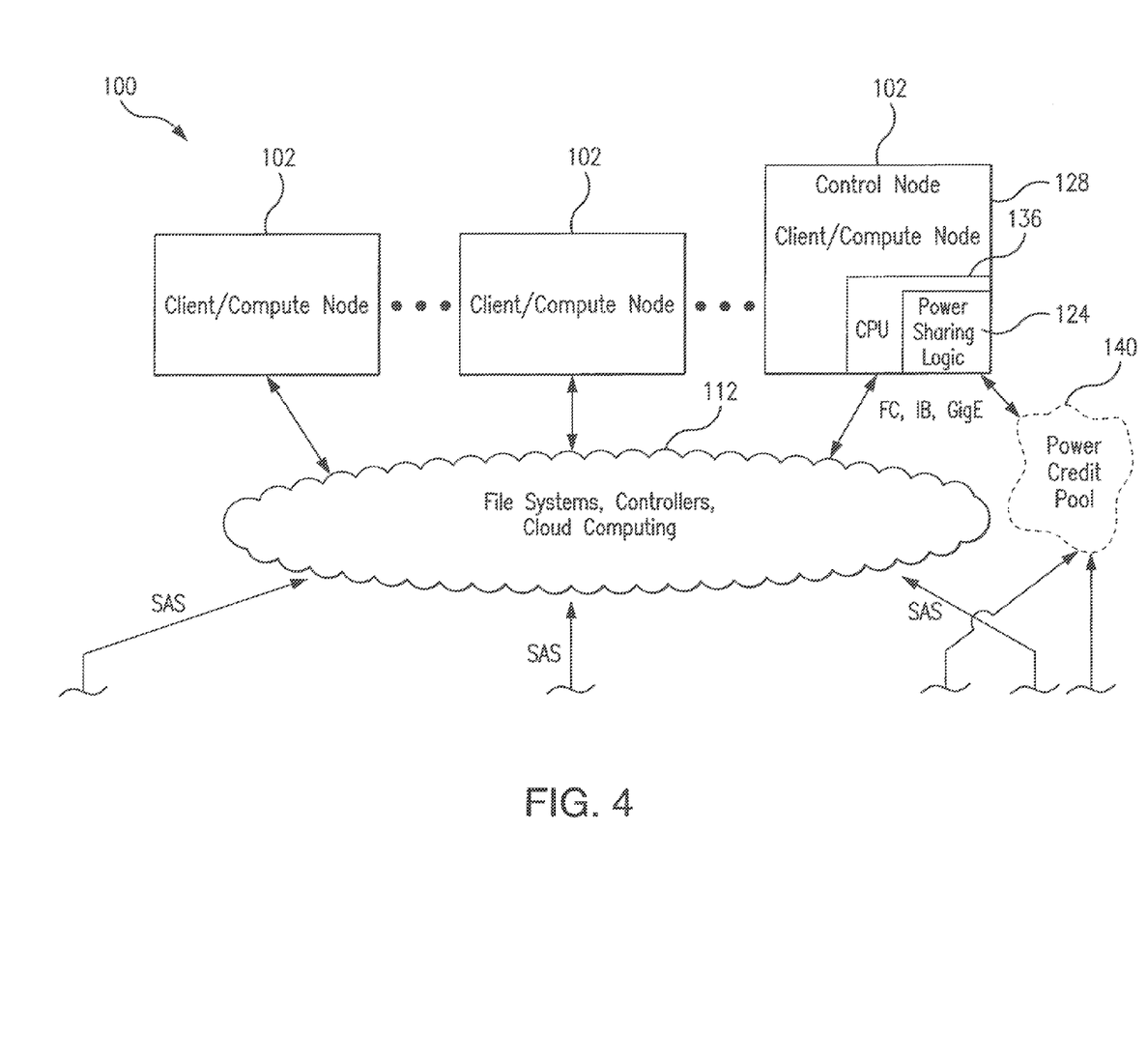
FIG. 4 is a block diagram of the data storage system of the present system showing the power monitoring and control mechanism provided by the control device residing at a compute node for drive enclosures.

Each monitored device reports its power conditions to the centralized monitoring nodes (control nodes) and either will be given an extra power budget (upon the device's request), or an extra power credit will be received therefrom (if the device in question operates below the power budget). The monitoring sub-system will be detailed in further paragraphs in conjunction with an exemplary implementation of the present system where a compute node monitors power usage and power requirements in a drive enclosure as shown in FIG. 4.

In order to manage and control the power budget across a number (also referred to herein as a cluster, or a group) of devices, the devices in the system 100 are configured with capabilities to elect one (or several) control devices (further referred to herein as control devices, or control nodes) 128. In the present system, a group (cluster) of devices may be considered as a group of equipment that is located physically within some area relationship, such as, for example, in one or more racks 104 or 116, an aisle of racks 106 or 118, a section of a laboratory or a separate room in a computational building. For example, the centralized control node 128 may be envisioned as residing in each rack 104 or 116. Then, the control nodes in each rack would share power credits between themselves. If communication is lost between the racks of devices, then the control nodes can no longer be able to share power between them, but they could still manage the equipment within a group (such as aisle) or a rack in which the control node 128 resides.

In the embodiments shown in FIG. 1, for example, the nodes, for example, compute nodes 102, elect one of their members to act as a control node 128 for the group of devices, including compute nodes 102, as well as data storage nodes 110, and devices in the high speed network 108 and the cloud computing equipment 112. The control node 128 receives power usage information from the compute nodes 102 in the same rack 104, as well as from the compute nodes 102 in other racks, and from the data storage nodes 110, as well as from the equipment in high speed network 108 and the computing cloud 112. All nodes under the control of the control node 128 either send power credits (in case of operating under their individual pre-allocated power budgets) to the control node 128 or may request power credits from the elected power control node 128 when needed for operation.

If during the operation, the control node 128 becomes inoperative, then the remaining members of the plurality of devices (nodes) elect a new control node among themselves and the power sharing process continues.

If, as shown in FIG. 2, the system 100 is split by a connection failure, each of the system portions 130 and 132 will elect their own control node. For example, the section 132 will have the control node 128, while the section 130 will elect the control node 134.

If communication is lost with the dedicated control node, then the equipment controlled by this control node, automatically returns to the pre-allocated power budget and the system continues to operate.

The present system 100 is implemented with the ability to operate in a scenario where communication among the control nodes is lost by having the power credits automatically reduced over time, meaning that the monitored nodes operating below their individual power budgets and giving away the power credits, specify a time interval and a rate at which the power credits must be reduced until a substantially zero level is reached. For example, a node can give away credits for 1000 Watts and specify that every minute the credit will be reduced by 100 Watts. Nodes that are given the reduced power credit do not need to send a reply. Instead, they reduce their power consumption accordingly or request more power credits.

If communication is lost between the devices, then they may automatically normalize their power usage and return to their individual pre-allocated power budgets. If communication is lost between groups of equipment, such as for example between racks 104, or racks 116, then nodes in each group can continue to share power credits. Credits given away to, and received from, nodes outside of their cluster, will expire until they reach zero, and the nodes within the group can continue to share their power with each other. Such an arrangement permits additional nodes, or groups of nodes, to be added and removed without reconfiguring the entire system.

If all of the nodes are requesting extra power credits, then the system will normalize to the predetermined power budget automatically since no free credits are available.

The control nodes can be assigned as dedicated control nodes, or individual nodes can be elected to be control nodes. The control of the power credits can be distributed between the control nodes. The election of control nodes occurs periodically in case control nodes become inoperative or communication between the control nodes is lost.

As shown in FIGS. 1-2, each data storage node 110 has a CPU 122 which provides the function of the control node. Similarly, a CPU 136 in compute nodes 102 can be configured to provide the subject active power monitoring and control function of the control nodes.

It is understood that other equipment such as high speed network 108, as well as cloud computing equipment, file servers, file systems, controller, storage controllers, etc., are provided with a control processor (CPU) which may be configured with the functions of power sharing provided by a control node.

The CPUs in each device of the data storage system 100 are configured to communicate with other monitored nodes, either located nearby or through the entire system 100, to share the power credits when needed. The CPUs receive the information on the current power usage and requirements from the monitored nodes in real time, and dynamically re-distribute power among the plurality of devices in accordance with the required power usage and respective power budget pre-allocated to each individual node in order to avoid exceeding a predetermined cumulative power budget assigned by a data administrator for the plurality of monitored nodes.

The control node(s) receive the extra power as power credits from the nodes which do not need the power, and either transfer the power credits to other nodes in need for extra power, or collect the extra power credits in a power credit pool 140, schematically shown in FIGS. 1-4. The power credit pool is based on the power required for the computational room or computational facility. No additional power (above the assigned power budget) is stored in the power credit pool 140.

For example, the data storage system 100 may normally consume 1000 kW, but can potentially consume up to 2000 kW, or more, if every device operates at full power. It may be cost prohibitive to provide 2000 kW of power when the system only needs 1000 kW at certain cycles. In order to provide an efficient and economical power usage for the data storage system 100, a system administrator will limit the power consumption below 2000 kW to a maximum of 1000 kW of power to the entire system (or a cluster of equipment), and the control nodes will coordinate the power requirements of all the equipment to ensure that cumulatively they do not exceed 1000 kW. In this example, the power credit pool constitute the 1000 kW of power.

In this scheme, each piece of equipment is allocated a minimum portion of the power depending on their needs. For example, when idle, the entire system 100 may consume only 200 kW of power. Thus, 800 kW of power can be given away to any piece of equipment which needs extra power. When operation begins, the storage modes may consume 600 kW of power, while the data is transferred. In a subsequent cycle, the compute nodes may require 700 kW of power while performing the calculations. The storage nodes in this scenario would return the extra power credits so they can be used by the compute nodes in need of extra power. After the compute nodes complete their operation, they can give up the extra power credits, so they could be consumed by the storage nodes to save the result of the computation. In this manner, the entire data storage system 100, being monitored and actively controlled by the control nodes, will not consume more than 1000 kW of power.

As shown in FIG. 3, in the current system 100, each node (including compute nodes, data storage nodes, the high speed network, and cloud computing equipment) has its own power supply 142 that is provided from a centralized power source 144 that may feed a group of equipment, such as, for example, nodes in the rack. The control node dedicated to the rack, in this implementation, can monitor and control the power usage of the equipment in the single rack, so that the cumulative power usage would not exceed the limits of the power source 144 which supplies the power.

The power sources in the system supply up to a certain maximum amount of power, and the sum total of the maximum power that could be supplied by the power sources 144 would constitute the power credit pool 140. Each node in the system 100, under the control of the control node 128, adjusts its own power usage based on its needs and any additional power credits it may receive from the control node (nodes).

In another example presented in FIGS. 1 and 2, each of the 20 storage nodes 110 may require a minimum of 1 kW of power and can consume up to a maximum of 4 kW. When each piece of equipment that is being controlled is initiated in the operation, they report their minimum and maximum power requirements to the centralized control nodes. The centralized control nodes, in response, pre-allocates a power budget for the equipment below the maximum requirement. So the cumulative minimum for the cluster of data storage nodes is 20×1 kW=20 kW, and the maximum power of the storage nodes cumulatively is 20×4 kW=80 kW. In the case where the system administrator decides to limit the power consumption of the storage nodes, for example to a cumulative of 40 kW at any time, each storage node 110 would be configured (pre-allocated) with the individual 2 kW of power.

When idle, each storage node will use 1 kW, and can give the extra 1 kW (2 kW–1 kW) of power to the control node, so that the control node can share the extra power received from the idle storage node with those equipment devices in need for extra power.

The power credits are physically located in the power sources, managed by the nodes, and shared by the control node. The power sources can report their current power output and maximum power output to the control nodes, so that the number of power credits is accounted for accurately.

Power Distribution Unit (PDU) 146 (also referred to herein as a power output unit) can be used to provide the above function. A Power Distribution Unit (PDU) is a device fitted with multiple outputs designed to distribute electrical power, especially to racks of computers and networking equipment located within the data center. Each PDU power inlet is fused for surge protection and power fluctuations. PDUs vary from simple and inexpensive rack-mounted power strips to larger floor-mounted PDUs with multiple functions including power filtering to improve power quality, intelligent load balancing, and remote monitoring and control by LAN or SNMP.

In data centers, larger PDUs are used to power multiple server cabinets. Each server cabinet may require multiple high current circuits possibly from different phases of incoming power or different UPSs.

In case when a data storage node needs to switch from the idle to active operation and needs extra power to initiate the operation, the data storage node can send out a request to the control node asking for more power credits. The power credits which are given away when the storage node is in the idle state and are unused by the control node, can be returned to the storage nodes in question automatically. A data storage node also may request more power credits if it needs more power than the pre-allocated individual power budget.

In the present system, the nodes report the ambient temperature they are experiencing so that a heat map 148 (shown in FIG. 1) of the facility (or a predetermined cluster of equipment) can be generated (either by the corresponding control node 128, or by the power monitoring system 126), so that abnormalities, such as, for example, hot spots can be identified on the heat map 148. This information can be used by the control nodes to avoid unwanted abnormalities in the heat map 148.

In order to obtain a satisfactory heat map, if abnormalities are identified on the heat map 48, the control node(s) can remove extra power credits from devices corresponding to hot spots identified on the heat map 148. For example, when the temperature readings are excessively high, there is a loss of outside power of a device, a drop in voltage is detected, or the power is metered for the time of day, the control nodes can selectively either remove excess power credits or send requests to devices to donate credits with high priority, depending on various situations, as illustrated in FIG. 1.

Referring to FIG. 3, a rack 104 of the compute nodes 102 is shown in communication with the rack 116 of the storage nodes 110. As seen, each of the compute nodes 102 and each of the storage nodes 110 is provided with the power monitoring logic 126, a power supply 142, and a control processor (CPU) 136 for the compute node 102, or CPU 122 in the data storage node 110.

For example, one of the compute nodes 102 is elected as a control node 128 to actively control power sharing among the compute nodes 102 in the rack 104 and the data storage nodes 110 in the rack 116. For these purposes, the control node 128 receives the power monitoring information 141 from the power monitoring logic 126 from each device in the monitored group, including, from each compute node 102, and from each data storage node 110 in question, and provides power sharing in the manner presented in previous paragraphs.

As shown, the power control node 128 receives requests 150 for extra power credits from one of the compute nodes 102 in the rack 104 and, in response, provides an extra power credit 153 which was shared by the storage node 110, which sends an extra power notification 154 and extra power credit 152 to the control node 128. The control node 128 operates to share the power usage among a plurality of devices in the system with the goal avoiding exceeding of a predetermined power level provided by the power credit pool 140 at peak moments of the system operation.

As an example of one of the alternative implementations of the present system 100, FIG. 4 illustrates the subject active power monitoring and control principles applied to the implementation with drive enclosures 160, each of which incorporates a plurality of data storage devices 162 and may be in the form of disc drives, as well as flash drives.

Each drive enclosure 160 is built with components for supporting I/O operation between the client/compute nodes 102 and the target storage devices 162 through the computing cloud 112. In the arrangement presented in FIG. 4 as an example, the control node 128 is arranged at the compute node 102. However, it is to be understood that the device enclosures 160 may also be provided with the function of a control node to control power sharing among the drive enclosures 160, compute nodes 102, data storage 162 devices, cloud computing equipment 112, etc. In the example presented in FIG. 4, the control node 128 receives the power monitoring information from each drive enclosure 160, and, in accordance with the principles of active power monitoring and control presented in previous paragraphs, the CPU 136 operates uses the algorithm 124 to control the sharing of power between the drive enclosures 160. Alternatively, the control node 128 can impose the power sharing between the data storage devices 162 in at least one of the enclosures 160.

It is to be understood that each drive enclosure 160 is provided with a power monitoring logic 126 which monitors the power enclosure and supplies it to the information control node 128. Each drive enclosure 160 may be provided with a control module 164 (also referred to herein as a control processor) which can be configured to serve as a control node when needed, which for example may be implemented as logic residing on the enclosure CPU 168.

FIG. 4 representing the exemplary subject data storage system 100, illustrates the details of the real-time monitoring of the power consumption, generated heat, available power level. Similar monitoring subsystems 126 are provided in other drive enclosures 160, as well as other units of equipment in the data storage system 100.

The functions of the monitoring logic 126 include monitoring the power consumption and heat level of all of the components in each drive enclosure 160, and communication of the information to the control node 128, which operates to determine if the power settings among the drive enclosures 160, or the power settings of the data storage drives 162 in a particular drive enclosure 160 are to be changed in order to avoid power overload and excessive temperature levels among the drive enclosures, or within each particular enclosure.

The control processor 136 of the control node 128 communicates with the power monitoring logic 126, the monitoring logic 166 in the power supply(s) 170 and/or 172, the temperature sensors 174 and fans 176 installed within each drive enclosure 160, the interposer of each drive 162, as well as directly with each drive 162.

The control node 128 may determine the power setting of each drive 162 during the discovery process through the interposers. Based on the information obtained during the monitoring operation, the control processor 136 in the control node 128 may dynamically change individual pre-allocated power budgets of any drive enclosure 160 as well as the individual power budgets of the drives 162, if needed, during operation through the SAS interface via the interposers.

Based on real-time power situation, the control processor 136 may dynamically share the power credits among the drive enclosures 160 as well as among the disks (and/or flash drives) 162 to limit their overall power consumption to the cumulative power budget assigned thereto so that the amount of power consumed does not exceed the pre-assigned power budget while maintaining optimal performance during read/write operations.

As shown in FIG. 4, the present data storage system 100 may make use of several low wattage power supplies 170 and 172 in the drive enclosure 160, i.e. redundant low wattage power sources. The power load in the drive enclosure 160 is shared between the redundant low wattage power supplies. Each redundant power supply operates under a budgeted maximum power level. Each of the redundant power supplies 170, 172 is sized to power the operation of the entire system, while the drive enclosure can effectively use only one of the power supplies, in the subject systems, operation of the drive enclosure may be flexibly powered by as many low wattage power supplies, as needed, in a power sharing manner.

The subject drive enclosure 160 with redundant power supplies 170, 172 uses less than the cumulative maximum power load of all of the supplies to prevent an overload in the event of one power supply failure. For example, if a pair of power supplies is provided in the drive enclosure 160, then less than an equivalent maximum of power load of one supply is used in case of a failure of another power supply.

The operation of the present system is supported by circuitry and logic which permits the drive enclosure to use the power equivalent to a single power supply out of all redundant power supplies for disks with active IO state while using the additional power from redundant power supplies for drives that are not performing IO or are spinning up.

Figure 5:
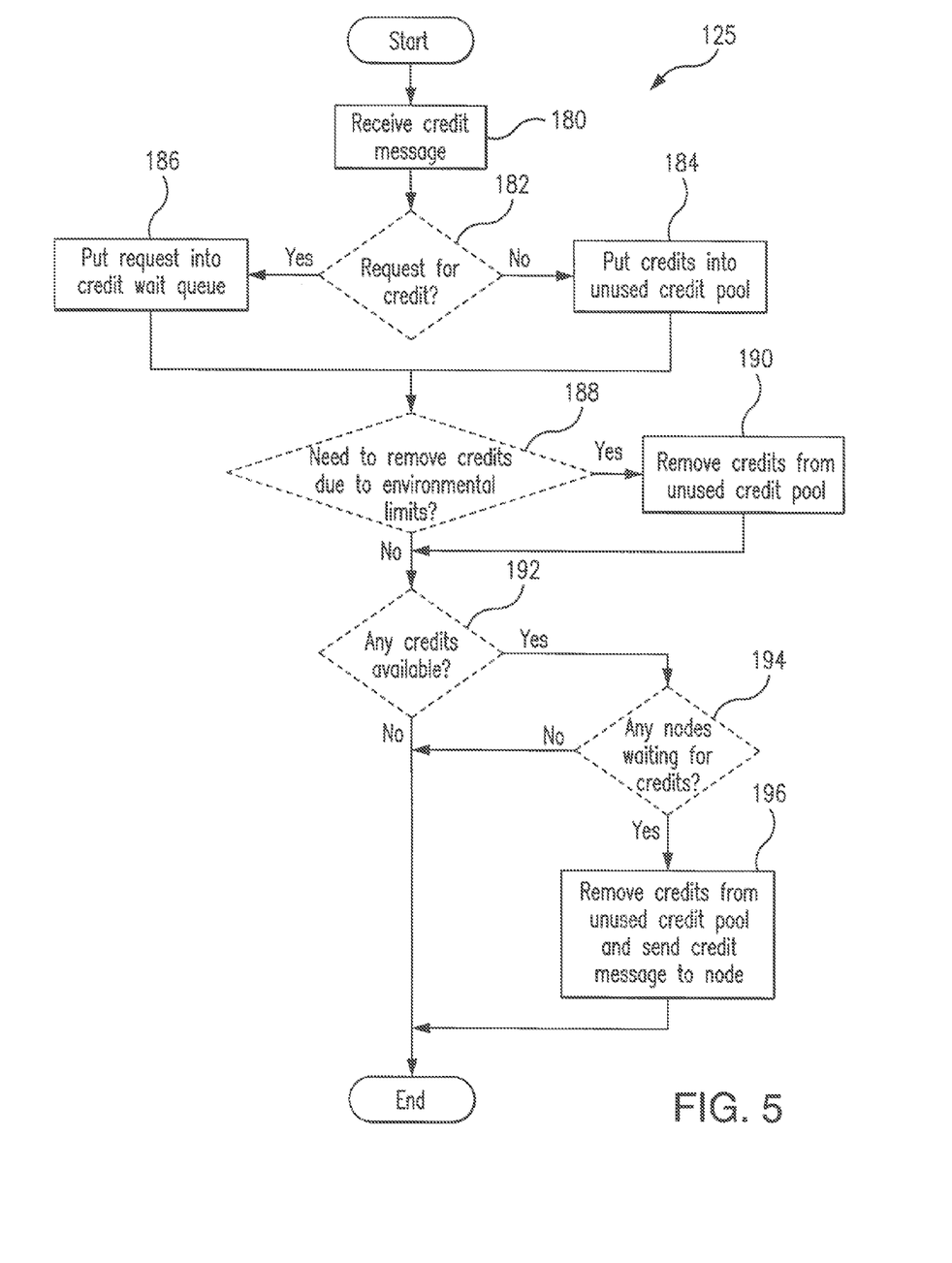
FIG. 5 is a flow chart diagram of the active power sharing logic underlying the operation of the present system; and, FIG. 6 is a flow-chart diagram of the active power managing logic underlying the operation of the present system.

Referring to FIG. 5, the active power sharing routine 125 of power monitoring and control logic 124 residing on the elected (or dedicated) control node, is initiated in step 180 "Receive Credit Message" where at least one device which operates at a power level below the individual pre-allocated power budget, can give away extra power credits at a specific cycle of the operation.

The logic further flows from step 180 to the logic block 182 "Request for Credits?". If there is a request for power credit from a device in need, the control node logic flows to step 186 and places the request into the credit "wait" queue for being forwarded to the device in need. If however there is no request for an extra power credit, the logic flows to step 184 and the power extra credits are placed into an unused credit pool.

Upon completion of steps 184 and 186, the logic proceeds to the logic block 188 where a determination is made whether there is a need to remove credits from the unused credit pool due to environmental limits. If there is a need to remove credits due to environmental limits, the logic performs the step 190, where the credits are removed from the unused credit pool.

If however there is no need to remove credits from the unused credit pool due to environmental limitations, the logic flows to logic block 192, whether the determination is made if any power credits are available. If credits are available in the unused credit pool, the logic flows to the logic block 194 where the determination is made if any nodes are waiting for power credits. If there are no nodes waiting for extra power credits, the procedure is completed.

If however, there are nodes waiting for extra power credits, the procedure flows from logic block 194 to block 196 to perform the step of removing the credits from unused credit pool. The credit message is sent to a node in need for extra power. Upon completion of the logic in step 196, the procedure is completed.

Figure 6:
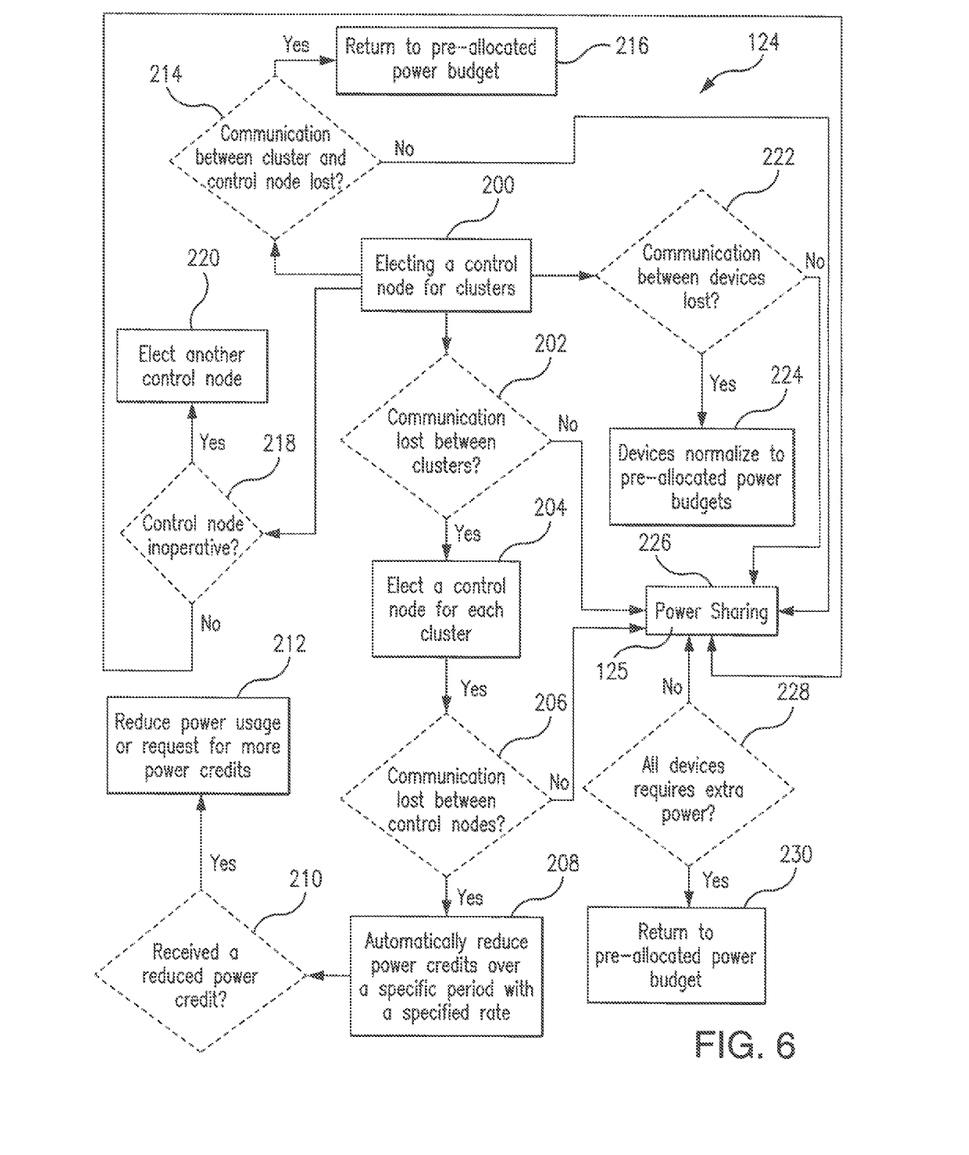

Referring to FIG. 6, representing the algorithm underlying the operational principles of the subject data storage system, and specifically the configuration of the active power monitoring and control logic 124, the procedure begins in step 200 by electing a control node for clusters (racks, groups) of devices.

In logic block 202, it is determined whether the communication between clusters (racks, groups) of equipment is valid or lost. If the communication is lost, the logic flows to step 204, where the devices in another cluster of equipment are prompted to elect their control node, so that each node is dedicated to controlling the power sharing in each cluster, as shown in FIG. 2.

From the step 204, the procedure passes to logic block 206, where it is determined whether communication is lost between control nodes. If communication between control nodes is lost, the procedure passes to step 208 where the power credits given away by nodes operating below their individual power budgets are reduced over a specified (by the nodes) time period at a specified rate.

If a reduced power credit is received at a node in need, as determined in logic block 210, this node either reduces its power usage, or requests additional power credits in step 212.

If in logic block 218, it is determined that a specific control node is inoperative, the procedure flows to step 220 where another control node is elected.

If in logic block 214, it is determined that communication between the respective cluster and the dedicated control node is lost, the logic flows to step 216 where the devices in the cluster return to their pre-allocated individual power budgets.

If in logic block 222, it is determined that communication between devices in a respective cluster is lost, the procedure passes to step 224 where the devices normalize their power usage to the individual pre-allocated power budgets.

If in logic blocks 202, 206, 210, 218, 214, and 222 no abnormal situation is found, the logic performs the power sharing routine 125 in step 226 as described in previous paragraphs in conjunction with FIG. 5.

If in logic block 228, it is determined that all devices need extra power, the logic follows to step 230, where all devices return to their pre-allocated power budgets. Otherwise, power sharing routine 125 continues.

Although this invention has been described in connection with specific forms and embodiments thereof, it will be appreciated that various modifications other than those discussed above may be resorted to without departing from the spirit or scope of the invention as defined in the appended claims. For example, equivalent elements may be substituted for those specifically shown and described, certain features may be used independently of other features, and in certain cases, particular applications of elements may be reversed or interposed, all without departing from the spirit or scope of the invention as defined in the appended claims.

What is being claimed is:

1. A data storage system with active power management, comprising:
- a plurality of devices, each of said devices having a respective individual power budget pre-allocated thereto, wherein said respective pre-allocated individual power budget is below a maximum power consumption of said each device, and wherein a cumulative power budget is defined as the sum of all pre-allocated individual power budgets for each of said devices,
- a power monitoring sub-system operatively coupled to said each device and configured for monitoring in real-time of a required power usage of said each device,
- a control processor residing in at least one control device of said plurality of devices in operative communication with said power monitoring sub-system to receive therefrom data corresponding to said required power usage of said each device, said control processor being configured to process said data and to dynamically re-distribute said cumulative power budget among said devices in accordance with said required power usage of each of said devices,
- wherein at least a first device of said plurality of said devices having said required power usage below said respective pre-allocated individual power budget of said first device is instructed by said control processor to share at least a portion of said first device's pre-allocated power budget with at least a second device,
- wherein said plurality of devices are configured to elect said at least one control device having said control processor residing thereat, and to elect another control device from said plurality of devices if said at least one control device becomes inoperative, and
- wherein said power monitoring sub-system is configured to monitor and report an ambient temperature and to form a real-time heat map covering said plurality of devices, and wherein said control processor is configured to control said power sharing among said plurality of devices in a fashion preventing abnormalities in said heat map.

2. The data storage system of claim 1, wherein said plurality of devices include devices from a group including data storage nodes, compute nodes, cloud computing equipment, file servers, switches, storage controllers, routers, data migration sub-systems, and drive enclosures populated with data storage nodes.

3. The data storage system of claim 1, wherein said plurality of devices include devices from a group consisting of: heterogeneous devices, and homogeneous devices.

4. The data storage system of claim 1, wherein said plurality of devices include devices arranged in a single group of nodes, and wherein said control processor is configured to control power sharing among said devices in said single group thereof.

5. The data storage system of claim 1, wherein said plurality of devices are arranged in at least a first group and at least a second group of devices, wherein said control processor resides at said at least one control device in said at least first group of devices, and wherein said control processor is configured to control power sharing among said devices in a group selected from a group consisting of said first group and said second group of devices.

6. The data storage system of claim 5, wherein said plurality of devices are configured to elect at least a first control device and at least a second control device, each control device being configured for controlling power sharing among devices in a respective one of said first and second group thereof if communication between said first and second groups of devices fails.

7. The data storage system of claim 1, further comprising a power credit pool coupled to said plurality of devices and said control processor residing at said at least one control device, said control processor being configured to receive extra power credits corresponding to said at least said portion of said first device's pre-allocated power budget from said at least first device and collect said extra power credits at said power credit pool, and transfer said extra power credits from said power credit pool to said at least second device, or return said extra power credits to said at least first device when required.

8. The data storage system of claim 1, wherein said at least second device is configured to generate a power request signal soliciting additional power and to communicate a power request signal to said control processor, and wherein said at least first device is configured to generate an available extra power signal, and communicate said available extra power signal to said control processor.

9. The data storage system of claim 8, wherein said at least second device is configured to generate said power request signal with a priority attached thereto depending on the urgency of said power request, wherein said power request signal is queued in said elected at least one control device, and wherein said power request is serviced based on a parameter including said priority.

10. The data storage system of claim 1, wherein said at least first device with said required power usage below said respective pre-allocated individual power budget is configured to specify a time interval and rate at which said at least said portion of said first device's pre-allocated power budget defining an extra power credit is reduced to a substantially zero level.

11. The data storage system of claim 10, wherein said at least second device is configured to reduce a required power usage thereof when receiving a reduced extra power credit.

12. The data storage system of claim 10, wherein said at least second device is configured to request an additional power credit when receiving a reduced extra power credit.

13. The data storage system of claim 10, wherein said each device of said plurality thereof is configured to automatically return to said respective individual power budget pre-allocated thereto when a communication between said devices fails.

14. The data storage system of claim 1, wherein said each device in said plurality thereof is configured to operate at said respective individual power budget pre-allocated thereto if said each device in said plurality thereof requests an additional power for an operation thereof.

15. The data storage system of claim 1, wherein said control processor is configured to transfer power from at least one respective device of said plurality thereof generating excessive temperatures or to at least one respective device experiencing loss of outside power.

16. The data storage system of claim 1, wherein said control processor is configured to generate high priority messages to said at least first device requesting a transfer of at least a portion of said first device's pre-allocated power budget said with high priority.

17. The data storage system of claim 7, further comprising at least one central power source supplying a predetermined power level to said plurality of devices,
   wherein said at least one central power source is operatively coupled to said power credit pool, and
   wherein said control processor controls power sharing between said plurality of devices to avoid exceeding of said cumulative power budget and said predetermined power level generated by said central power source.

18. The data storage system of claim 17, wherein said at least one central power source is configured with a power output unit for managing and reporting a power output and a maximum power output thereof to said control processor.

19. A method for an active power management in a data storage system, comprising the steps of:
   (a) operatively interconnecting a plurality of devices into a respective at least one group of devices,
   (b) pre-allocating at least a first and at least a second device of said plurality thereof with a first and a second individual power budget, respectively, wherein said first and second individual power budgets are below a maximum power usage of said at least first and second devices, respectively,
   (c) configuring each of said at least first and second device with a monitoring sub-system to monitor a required power usage of said at least first and second device,
   (d) electing at least one control device from said plurality of devices by configuring said at least one control device with a control processor in communication with said monitoring sub-system of said at least first and second devices to receive therefrom data corresponding to said real-time required power usage of said at least first and second devices, and electing another control device from said plurality thereof if said at least one control device is inoperative,
   (e) configuring said control processor for dynamically sharing power among said at least first and second devices in accordance with required power usage and said first and second individual power budgets of said at least first and second device through the step of:
   (f) controllably sharing extra power credits of said at least first device having said required power usage below said first pre-allocated individual power budget with at said least second device having said required power usage exceeding said second pre-allocated individual second power budget, thereby dynamically changing said first and second pre-allocated power budgets; and
   monitoring an ambient temperature by said monitoring sub-system of each of said at least first and second devices,
   producing, by said at least one control processor, a real-time heat map of said plurality of devices based on said monitored ambient temperature, and
   requesting, by said at least one control processor, an extra power credit of said at least one first device in a fashion preventing abnormalities at said real-time heat map.

20. The method of claim 19, further comprising the step of:
   in said step (f), generating an extra power request at said at least second device and communicating said extra power request to said at least one elected control device.

21. The method of claim 20, generating said extra power request with a high priority depending on the urgency of said extra power request.

22. The method of claim 19, further comprising the steps of:
   in said step (b), specifying, at said at least first device, a time interval and a rate at which said shared extra power is automatically reduced to substantially zero level over said specified time interval, and
   after said step (f):
   reducing the power usage at said at least second device in accordance with said reduced power received at said at least second device, or
   requesting, by said at least second device, an extra power from said at least one control device, or
   dynamically adjusting said required power usage of said at least second device to said pre-allocated second individual power budget.

23. The method of claim 19, wherein said at least one control device and said at least first and second devices are devices in the same group of devices.

24. The method of claim 19, wherein said at least one control device is a device in one group of devices, and said at least first and second devices belong to another group of devices.

25. The method of claim 19, further comprising the steps of:
   electing, in said step (d), a plurality of said control devices, and
   distributing, among said plurality of control devices, a function of controlling the sharing of the extra power credits between said plurality of devices.

26. The method of claim 19, further comprising the steps of:
   in said step (d), electing said at least one control device periodically from said plurality of devices.

27. The method of claim 19, wherein said devices in the data storage system include at least one device from a group including: data storage nodes, compute nodes, file servers, switches, storage controllers, data migration subsystems, drive enclosures populated with data storage nodes, and cloud computing equipment.

28. The method of claim 19, wherein said plurality of devices include heterogeneous devices.

29. The method of claim 19, further comprising the steps of:
   prior to said step (e):
   forming a power credit pool coupled to said plurality of devices and to said at least one control device,
   forwarding to said control processor of said at least one control device said extra power credits from said at least first device, and collect said extra power credits in said power credit pool, and
   transferring, by said control processor, said extra power credits from said power credit pool to said at least second device upon extra power request received at said at least one control device from said at least second device.

30. The method of claim 29, further comprising the steps of:
   returning, by said at least one control device, said extra power credits to said at least first device when required by dynamics of operation of said at least first device.

31. The method of claim 19, further comprising the step of:
   operating each of said plurality of devices at said respective pre-allocated individual power budget if each device in said plurality thereof requests an extra power.

\* \* \* \* \*